United States Patent [19]
Wiegand

[11] 3,715,814
[45] Feb. 13, 1973

[54] SHOCK ABSORBER DEMONSTRATION STAND

[75] Inventor: John A. Wiegand, Northbrook, Ill.

[73] Assignee: Maremont Corporation, Chicago, Ill.

[22] Filed: Sept. 28, 1971

[21] Appl. No.: 184,639

[52] U.S. Cl. ....................................................35/49
[51] Int. Cl. ..............................................G09b 25/00
[58] Field of Search.....................................35/49, 50

[56] References Cited

UNITED STATES PATENTS 3,478,445  11/1969  McAfee....................................35/49

Primary Examiner—Harland S. Skogquist
Attorney—Cushman, Darby & Cushman

[57] ABSTRACT

The disclosure relates to a shock absorber demonstration stand for a load supporting damper unit of the type having a variable volume load supporting air chamber therein, which is utilized in load levelling suspension systems. The demonstration stand includes a support frame having a movable lever arm mounted thereon with the damper unit having one end fixedly attached to the frame and its other end attached to the movable lever arm so that upon actuation of the lever arm, the damper unit can be extended or contracted along its longitudinal axis. The demonstration stand further includes an air compressor unit which is housed in the frame and is of the type which substantially continuously supplies fluid at a predetermined pressure to a constant volume chamber. Fluid pressure is supplied to the air chamber of the damper unit through a conduit and a control valve, the conduit being connected to the chamber in the compressor unit. The control valve is manually operable so that an individual can control the amount of fluid pressure delivered to the air chamber of the damper unit.

5 Claims, 4 Drawing Figures

PATENTED FEB 13 1973
3,715,814
SHEET 2 OF 2
Fig. 2.
Fig. 3.
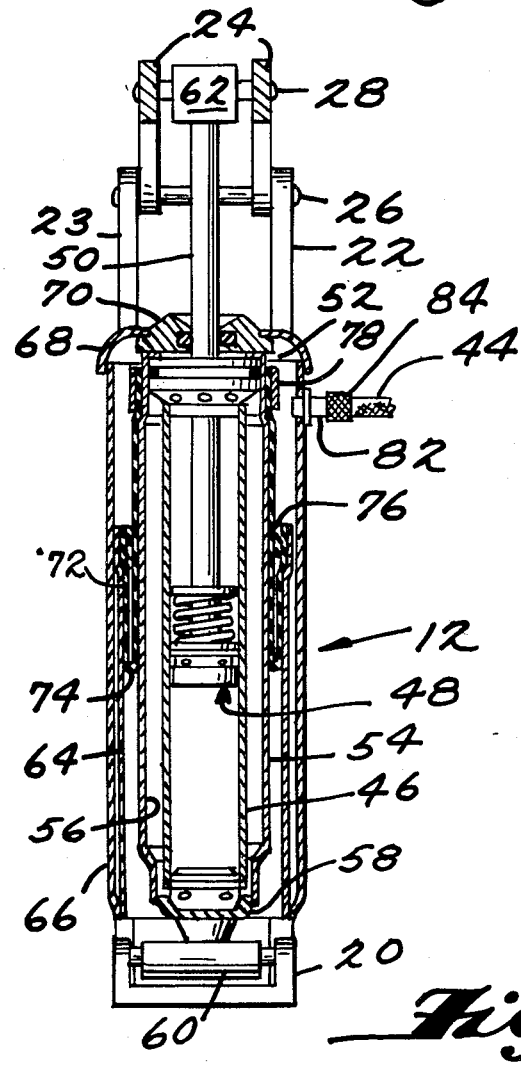
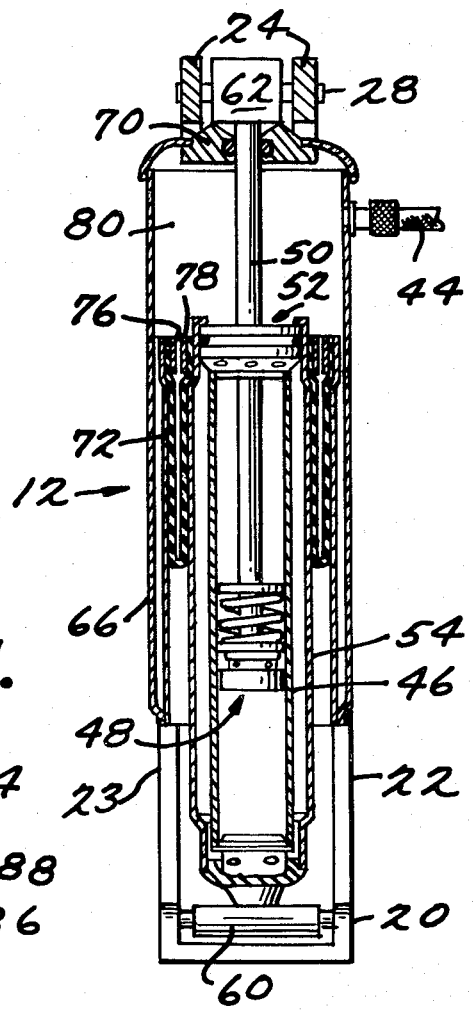
Fig. 4.
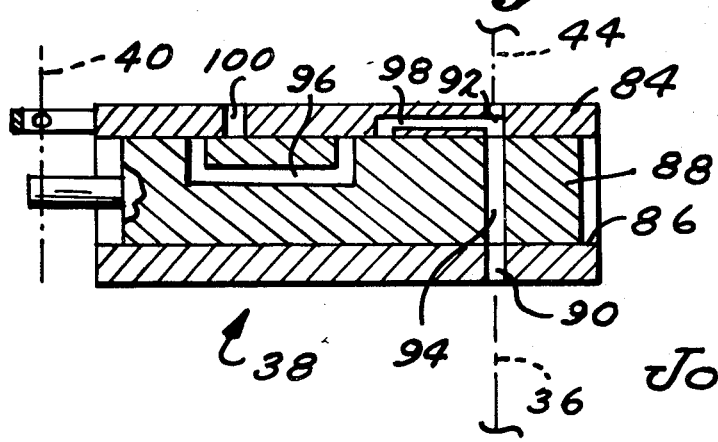
INVENTOR
JOHN A. WIEGAND
BY Cushman, Darby & Cushman
ATTORNEYS

SHOCK ABSORBER DEMONSTRATION STAND

BACKGROUND OF THE INVENTION

The present invention relates to demonstration stands for vehicular shock absorbers of the type capable of adjustment so that the sprung mass of the vehicle may be carried at a particular desired height relative to the unsprung mass for any given load. More specifically, the demonstration stand of this invention will enable an individual comtemplating the installation of the aforementioned type of shock absorbers to operate a unit in a manner analagous to its actual operation and to visually observe the load-levelling characteristics of the shock absorber unit as well as to manually experience the different damping characteristics corresponding to each of the different height adjustments of which the shock absorber unit is capable.

The use of fluid pressure operated self-levelling and damping units to maintain the sprung mass of a vehicle in predetermined vertical relation with respect to the unsprung mass have been known. In general, such units have basically consisted of a direct, double acting, hydraulic shock absorber which is provided with a cylinder, a valve piston mounted in the cylinder and a piston rod connected to one side of the piston to extend out of one end of the cylinder through appropriate sealing means. The opposite ends of these shock absorbers are connected respectively between the frame and axle of the vehicle. When the vehicle's springs are compressed, as occurs when the wheels of the vehicle strike a roadway elevation, the piston of a shock absorber will move in its compression stroke, that is, downwardly in the cylinder of the shock absorber. When the vehicle's springs expand, the piston of the shock absorber moves in its rebound stroke, that is, usually upwardly in the cylinder. Valve means are provided in the piston of the shock absorber to control the flow of fluid through or around the piston from one side thereof to the other during the compression and rebound strokes. The amount of displacement of which the piston in the cylinder of the shock absorber is capable is, of course, dependent upon the length of the cylinder itself. In general, in order to increase the marketability of their product, shock absorber manufacturers have attempted to construct their shock absorber units so as to render them capable of satisfactory performance for a fairly broad range of vehicle road conditions. One manner of extending the versatility of a shock absorber unit with respect to the range of road conditions that could be handled is to pre-suppose a relatively narrow range of loads that a particular shock absorber unit would be manufactured to support. As a result the valve mechanisms in a given type of shock absorber could more readily and inexpensively be manufactured and adjusted so as to render the unit capable of handling a broader range of road conditions.

For certain types of vehicles, such as pick-up trucks, station wagons or the like, the variance in static loads placed thereon is much wider than is the case with the conventional passenger vehicle. Accordingly, it is highly desirable from the point of view of driving safety that shock absorber units of the load-levelling type be employed to maintain the sprung mass of such vehicles at a substantially predetermined height with respect to the unsprung mass thereof. It is also important and highly desirable from the point of view of vehicle control that the operator of a vehicle in which such load-levelling shock absorbers are installed be made aware of the often substantial differences in damping characteristics when such shock absorbers are operating in their fully loaded mode as opposed to their load free mode.

The shock absorber demonstration stands of the prior art have generally been characterized by the provision of a spring biased lever arm to which one end of one or more shock absorbers is fixed while the other end of the shock absorber is fixedly attached to another portion of the stand. These demonstration stands have been useful in demonstrating the operation of the conventional telescoping shock absorber unit with respect to the spring used to bias the lever arm or arms.

The present invention provides a shock absorber demonstration stand equipped with means for displaying the operation of a load-levelling shock absorber unit and for permitting the operator of the demonstration stand to control the load-levelling adjustment of the shock absorber unit while simultaneously permitting an individual to experience the differences in damping characteristics of such shock absorbers when in their various adjusted positions. Use of the demonstration stand of this invention will, therefore, enable a prospective purchaser to more readily appreciate the differences in the functioning of a load-levelling type shock absorber when such a shock absorber is adjusted through its various load-levelling positions than could be demonstrated by using the stands of the prior art.

BRIEF SUMMARY OF THE INVENTION

An embodiment of the demonstration stand of the present invention consists in the provision of a housing having a platform which is generally horizontally disposed and to which is attached two rigid posts. The posts extend generally perpendicularly from the platform and pivotally support at their upper end a lever arm which extends outwardly towards the front of the housing. Suitable means are provided for mounting one end of the shock absorber on the platform so that the shock absorber will be able to be moved about a generally horizontal axis. The other end of the shock absorber is mounted on a pin which is attached to the lever arm so that when the lever arm is pivoted about its horizontal axis the shock absorber mounted between the lever arm and the base platform will be correspondingly expanded or contracted. A constant pressure delivering air compressor unit is stored in the base of the housing and is connected to the variable volume air chamber of the shock absorber unit by means of conventional fluid conduits. A manually operated three position valve is employed to control the expansion and contraction of the air chamber of the shock absorber so that a user of the stand will be able to vary the amount of fluid under pressure that is delivered to the air chamber of the shock absorber.

The apparatus of the present invention will permit a user of the device to readily compare the differing shock damping characteristics of a load-levelling unit throughout the range of adjustments of which the unit is capable by simply operating the lever arm after having selected a desired load-levelling position.

It can be appreciated, then, that the demonstration stand of this invention will greatly facilitate a prospective purchasers understanding of the operation of load-levelling shock absorber units and will impress upon such a purchaser the continuing necessity of exercising due care when driving a heavily loaded vehicle even when such shock absorber units have been installed on his vehicle.

Accordingly, it is a principle object of this invention to provide a demonstration stand which will permit a user of the stand to simulate the actual operation of a load-levelling type shock absorber in a variety of its possible adjusted positions. Another object is to enable a user of the stand of this invention to experience the differences in the damping characteristics of a load-levelling type shock absorber unit corresponding to the different adjusted positions of the unit.

The foregoing and other features and advantages of the present invention will become apparent in the more detailed discussion that follows, and in that discussion, reference will be had to the accompanying drawings as described below.

BRIEF DESCRIPTION OF THE DRAWINGS

FIG. 2 is a vertical sectional view of a self-damping suspension unit in a collapsed operating position;

FIG. 3 is a vertical sectional view similar to that of FIG. 2 but with the unit in an expanded operating position; and FIG. 4 is a sectional view of a valve means for use in operating the demonstration stand of this invention.

DETAILED DESCRIPTION OF THE INVENTION

Figure 1:
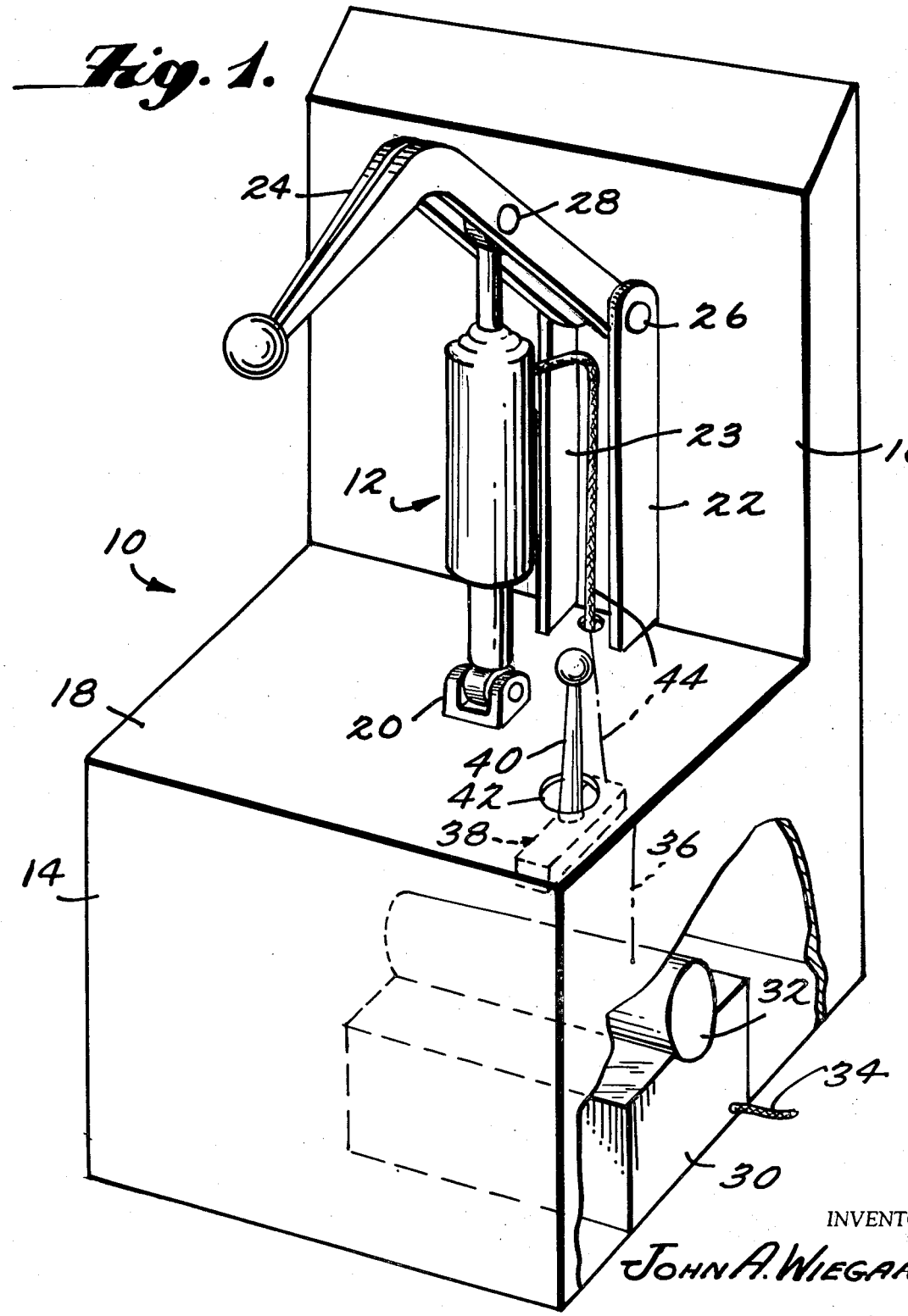
FIG. 1 is a view in perspective of the demonstration stand of the present invention.

Referring now to the drawing, there is shown in FIG. 1 an embodiment of the shock absorber demonstration stand of the present invention, generally indicated at 10 which is adapted to demonstrate the operation of a load-levelling type shock absorber 12 which is similar to that disclosed in U.S. Pat. No. 3,149,830 of Sept. 22, 1964, granted to R. J. Broadwell and assigned to the same assignee as the present invention.

The stand 10 consists of a housing 14 which may be formed by connecting together along their edges a plurality of sections of sheet metal or like material. An upstanding back portion 16 may be provided if desired for carrying operating instructions or descriptive material. The housing 14 includes a platform 18 which is generally horizontally disposed and has a bracket 20 securely attached thereto for pivotally supporting one end of shock absorber 12.

Adjacent the rear edge of platform 18, two upstanding posts 22 and 23 are disposed to rigidly extend from platform 18 in substantially perpendicular relation thereto. A bifurcated lever arm 24 is pivotally mounted on a pin 26 which extends through apertures in the upper ends of posts 22 and 23. The ends of the pin 26 may be upset to hold it securely in place in the posts' apertures.

The upper end of shock absorber 12 which is provided with a ring connector as is the lower end, is pivotally attached to lever arm 24 by means of a pin 28 which extends between the bifurcated arm portion of lever arm 24. With the arrangement as thus far described, an operator of the device will be able to move the piston of the shock absorber 12 through its simulated compression and rebound strokes simply by pivoting lever arm 24 about pin 26.

Enclosed within the base of housing 14 is an air compressor 30 which is of conventional design. In particular, compressor 30 may be of the electrically driven type which includes an air pump which delivers air through a one-way valve to a chamber 32. The motor that is employed to drive the pump of the compressor 30 is controlled by a switch which is sensitive to the fluid pressure in chamber 32 so that when the motor is connected to a source of electrical power as through conductor 34 and the pressure of the fluid in chamber 32 falls below a predetermined value, the switch will operate to deliver current to the motor of the pump of compressor 30 so that the pump will operate to pressurize the fluid in chamber 32 up to a predetermined value at which time the switch will operate to cut off the motor. With this arrangement, the pressure of the fluid in chamber 32 will be maintained at a substantially uniform level.

It will be understood, of course, that instead of using a compressor 30 as described above, a tank may be employed which contains compressed air under high pressure and which is provided with a metering valve of conventional design so that the air can be bled from tank at a substantially uniform pressure so as to permit the proper operation of the demonstration stand of this invention for a period of time commensurate with the capacity of the tank to deliver air at the appropriate pressure.

Air is fed from chamber 32 (or the tank noted above) through conduit 36 to a three-position valve 38 which is operated by lever 40. The housing of valve 38 may be attached directly to the underside of platform 18 so that the lever 40 will extend upwardly through an opening 42 to be readily operable by a user of the device. Fluid under pressure may be supplied to or vented from the air chamber of the shock absorber 12 through conduit 44 which extends from the valve 38 through an opening in the platform 18 to the shock absorber 12.

Referring now to the detailed sectional view of FIG. 2, there is illustrated a load-levelling type shock absorber unit 12, the operation of which the stand 10 of the present invention is intended to demonstrate. The shock absorber 12 includes an interior cylinder or cylindrical member 46 having a piston assembly 48 reciprocably mounted therein. While the details of construction of the piston assembly are not shown in the drawings, it will be understood that appropriate restricted orifices are provided by the assembly to permit passage of hydraulic fluid within the cylinder 46 from the upper portion thereof to the lower portion thereof, and vice versa. Connected with the piston assembly 48 and extending upwardly therefrom is a piston rod 50. The piston rod extends outwardly of the cylinder 46 through a sealing assembly, generally indicated at 52. Here again, the details of construction of the sealing assembly have not been illustrated in the drawings since they may be of any conventional construction. For present purposes, it is sufficient to note that the assembly 52 provides a seal for the upper end of the cylinder 46 and about the periphery of the piston rod 50.

The shock absorber 12 also includes a tubular element 54 which is disposed in surrounding relation to the cylinder 46 and defines therewith an annular replenishing chamber 56. The upper end of the tubular element 54 is bent over and secured to the sealing assembly 52 and the lower end thereof is secured to an end closure member 58 which is also secured to the lower end of the cylinder 46. The end closure member will, of course, include the conventional valved orifices for controlling passage of hydraulic fluid into and out of the replenishing chamber 56. As is conventional, a ring connector 60 is rigidly attached to the lower end of the closure member 58 on the exterior thereof and a similar ring connector 62 is also attached by welding to the upper end of the piston rod 50.

To obtain the load-levelling characteristics, shock absorber 12 is provided with an outer part which preferably is made up of an inner tubular element 64 which is welded or otherwise fixedly and sealingly secured at its lower end to a lower end of an outer tubular element 66. The upper end of the outer tubular element 66 is, in turn, welded or otherwise fixedly and sealingly secured to the outer periphery of a dish-shaped ring member 68. The inner periphery of the ring member 68 is secured, as by welding or the like, to the outer periphery of a closure member 70. Mounted between the tubular element parts 54 and 64 is a folded rolling seal 72. The seal 72 is preferably made of a suitable flexible material which has a considerable resistance to expansion or compression, such as a woven sleeve of fibrous material imbedded within a molded or extruded plastic or rubber material. The sleeve is mounted between the tubular element parts by folding the same upon itself so as to provide a fold indicated at 74, intermediate the ends thereof which divide the sleeve into an outer folded portion and an inner folded portion. Any suitable means may be provided to effect the securement of the sleeve ends to the tubular elements 54 and 64 such as an expanded ring 76 and a compressed ring 78, respectively. Thus, an air chamber 80 is defined by elements 66, 64, 68 and 72.

In order to introduce and maintain air under pressure within the chamber 80, there is provided a conventional tire valve 82 which is suitably mounted in the upper portion of the tubular element 66. The tire valve is of conventional construction and therefore the internal working parts thereof have not been illustrated in the drawings. It will be understood that the valve includes the usual check valve member which is normally spring pressed to prevent the air in the chamber 80 from communicating with the atmosphere. Conduit 44 is provided at its end with a projection in member 84 which when threaded onto the valve 82 will maintain the valve in an open position. Alternatively and preferably, for the purposes of demonstrating the operation of shock absorber 12, conduit 44 may be connected directly to the interior of chamber 80.

With the introduction of a preselected amount of air under pressure into chamber 80, the elements of shock absorber 12 will assume the positions illustrated in FIG. 3, namely, the outer tubular element will move upwardly until the closure member 70 abuts the ring connector 62 assuming that there has been no movement of the lever arm 24. By supplying additional air under pressure to chamber 80, it will be understood that piston rod 50 will be moved upwardly from its position as illustrated in FIG. 3 until the rolling seal 72 is fully extended. This will result in the movement of the piston rod 50 and piston assembly 48 upwardly with respect to the interior of cylinder 46 until the upper portion of the piston assembly 48 is closely adjacent to the sealing assembly 52.

It will be understood that when the shock absorber 12 is partially extended as illustrated in FIG. 3 or fully extended as described above, the damping characteristics will be determined by not only the flow of hydraulic fluid within cylinder 46 through the piston assembly 48 but also by the compression of the compressed air in chamber 80. On the other hand, when the elements of the shock absorber 12 are disposed as illustrated in FIG. 2, the damping characteristics will be solely dependent on the restricted flow of hydraulic fluid past the piston assembly 48. It will be apparent therefore that when the shock absorber 12 is employed as a load-levelling strut member with the parts disposed as illustrated in FIG. 3, the damping characteristics will be noticeably different when the piston assembly 48 moves through its compression stroke, that is, downwardly as viewed in FIG. 3 in cylinder 46 and that the rebound stroke distance will be diminished by an amount corresponding to the displacement of the closure member 70 from the sealing assembly 52. Additionally, with the rolling seal 72 fully extended, corresponding to a substantial load being placed on the vehicle, the compression stroke of the piston assembly 48 will be resisted both by the hydraulic fluid in the cylinder 46 as well as the very highly compressed air in chamber 80 while the rebound stroke in these circumstances will be much more rapid since it is assisted by the expansion of the air in chamber 80. It should also be noted that the variation in the damping characteristics of the shock absorber is a continuous function as opposed to a discrete one since the air pressure in chamber 80 can be varied over a continuous range as can the degree of expansion of chamber 80 within the limits imposed by the size of the rolling seal 72.

With respect now to FIG. 4, there is shown an embodiment of a valve means which can be used in the demonstration stand of the present invention. Valve 38 is of the three position type and consists of a cylindrical member 84 which is provided with a smooth bore 86. An elongated plug 88 is slidably carried in bore 86 and is of dimensions such that a close interfit will be achieved between the exterior surfaces of plug 88 and with the interior surfaces of the bore 86. Fluid passages 90 and 92 are provided in cylindrical member 84 so that when the passage 94 in plug 88 is aligned therewith as shown in FIG. 4 compressed air will be passed from air chamber 32 to the air chamber 80 of the shock absorber 12 through conduits 36 and 44. By sliding plug 88 to the right as viewed in FIG. 4 by appropriate manipulation of lever 40, passage 90 will be sealed off while passage 96 will be moved into communication with passage 92 through passage 98 at one end thereof and with vent passage 100 at the other end thereof to thus enable compressed air from air chamber 80 of the shock absorber 12 to be vented to atmosphere. By moving plug 88 to the left as viewed in FIG. 4, all of the air passages connected with both the air chamber 80 and the air chamber 32 of the compressor 30 will be sealed off. An operator of the demonstration stand 10 can manipulate valve 38 so that it will function as a metering valve by only partially aligning passage 94 with passages 90 and 92 so that compressed air can be delivered to air chamber 80 of the shock absorber 12 as gradually as desired. It should be understood that other types of valve devices may be employed to control the supply of compressed air to shock absorber 12 and that the foregoing description is merely illustrative of one embodiment of a suitable valve means.

Although the invention has been described with reference to a particular embodiment, it will be understood that variations in the described embodiment will become obvious to those skilled in this art. Also certain modifications or additions can be made to the described structure and all obvious variations and modifications are intended to be included within the scope of this invention.

What is claimed is:

1. A demonstration stand for exhibition of the damping characteristics of a shock absorber of the type having a pair of parts mounted for relative telescopic movement toward and away from each other, a folded seal mounted between said parts and defining therewith an air chamber, means communicating with said air chamber providing for the introduction and exhaust of air under pressure into and out of said chamber, said movement of said parts toward and away from each other occurring with the exhaust and introduction of air, respectively, out of or into said air chamber, each of said parts having connecting means fixed thereto, said stand comprising in combination:

a support structure having means for holding said connecting means of one of said parts, a manually engageable lever arm connected to said support structure and movable toward and away from said holding means of said support structure, said lever arm having means for holding the said connecting means of the other of said parts, a source of air under pressure and a manually operable control valve having a plurality of air passage means and a plurality of operative positions, a first air conduit having one end in fluid communication with said source and its other end communicating with a first of said passage means of said control valve, a second air conduit having one end for establishing fluid communication with said means communicating with said air chamber of said shock absorber and its other end in communication with a second of said passage means of said control valve, said stand further comprising means for placing, in turn, said control valve in each of its operative positions, a first of said positions establishing fluid communication between said first and second passage means so that air under pressure will be delivered from said source through said first air conduit, said first and second passage means and said second conduit to said air chamber of said shock absorber to effect said movement of said parts away from each other, said plurality of passage means including a third passage means in communication with atmospheric pressure, a second of said positions establishing fluid communication between said second air conduit and said second and third passage means so that air will be exhausted from said air chamber of said shock absorber and said parts will be moved towards each other upon movement of said lever arm toward said holding means of said support structure.

2. The demonstration stand as claimed in claim 1 wherein said plurality of positions of said valve includes a third position in which fluid flow to or from said second air conduit is prevented.

3. The demonstration stand as claimed in claim 1 wherein said support structure includes a platform and two upright posts extending in spaced apart generally parallel relation substantially perpendicularly from said platform, said posts having upper ends which are connected by a pin, said lever arm having one end pivotably mounted on said pin.

4. The demonstration stand as claimed in claim 1 wherein said source of air under pressure is an air compressor.

5. The demonstration stand as claimed in claim 2 wherein said control valve is a slide valve having a plug member and a casing having a bore, said plug being slidably disposed in said bore, and said means for placing, in turn, said control valve in each of its operative position is a lever connected to said plug.

* * * * *